United States Patent
Glanz (10) Patent No.: US 8,550,291 B2
(45) Date of Patent: Oct. 8, 2013

(54) COLLAPSIBLE HANDLES FOR COOKWARE

(76) Inventor: Daniel Glanz, Mevaseret Zion (IL)

(*) Notice: Subject to any disclaimer, the term of this patent is extended or adjusted under 35 U.S.C. 154(b) by 130 days.

(21) Appl. No.: 13/241,442

(22) Filed: Sep. 23, 2011

(65) Prior Publication Data

US 2013/0074289 A1 Mar. 28, 2013

(51) Int. Cl.
*B65D 25/28* (2006.01)

(52) U.S. Cl.
USPC ............ 220/757; 220/761; 220/763; 220/756

(58) Field of Classification Search
USPC .................. 190/117, 115; 220/757, 756, 752, 220/573.1, 763, 761; 16/429
See application file for complete search history.

(56) References Cited

U.S. PATENT DOCUMENTS

| | | | |
|---|---|---|---|
| 3,401,827 A | 9/1968 | Messina et al. | |
| 4,944,399 A | 7/1990 | Ten Bruggencate et al. | |
| 4,974,742 A | 12/1990 | Farrell et al. | |
| 5,373,708 A | 12/1994 | Dumoulin, Jr. | |
| 5,467,915 A | 11/1995 | Mattson | |
| 8,096,955 B1 * | 1/2012 | Vazquez | 600/562 |

FOREIGN PATENT DOCUMENTS

DE 202004017853 U1 * 4/2006

OTHER PUBLICATIONS

English translation of DE202004017853, machine generated, May 14, 2013 byEspacenet.*
REI, GSI Outdoors Pinnacle Dualist Cook System—item No. 783287, Web page, accessed: May 6, 2011.
REI, GSI Outdoors Bugaboo Base Camper Cookset—Large—item No. 784110, Web page, accessed: May 6, 2011.

* cited by examiner

*Primary Examiner* — Stephen Castellano
(74) *Attorney, Agent, or Firm* — Michael J. Feigin, Esq.; Feigin & Associates, LLC (57) ABSTRACT

The disclosed technology comprises cookware and other vessels (any item capable of non-permeable retention of liquid), such as pots and pans with rugged and collapsible handles which may decrease in length to be ⅓ or less than their extended size and are usable in both a collapsed or an expanded state. Such handles, in embodiments of the disclosed technology, have covers or ends which, in a collapsed configuration of the handle, entirely cover most or all of the extendable portion of the handle, the covers usable as handles when collapsed. Individual links of the handle have inward flanges and protrusions adapted to keep the links from disconnecting, and fold into one another in a cascading manner, either becoming successively smaller, or being of equal overall size or width. Exterior notches on each link are used to keep the links from expanding and contracting into one another without lateral force applied.

6 Claims, 14 Drawing Sheets

COLLAPSIBLE HANDLES FOR COOKWARE

FIELD OF THE DISCLOSED TECHNOLOGY

The disclosed technology relates generally to handles and more specifically to collapsible handles.

BACKGROUND OF THE DISCLOSED TECHNOLOGY

There is a need in the art to provide sturdy cookware that takes up as little space as possible. Pots, pans, and so forth, typically have a body with extending handle. While a smaller pot takes up less space on the range and/or stove and the closet, the obvious downside is the reduced capacity of the pot. Regarding the pot handle. It may be permanently attached, foldable or removable; this impacts on strength of the handle and its connection to the pot, as removable attachments are generally weaker than attachments fixed by welding or any other method known in the art.

Examples of the prior art include U.S. Pat. No. 4,944,399 to Bruggencarte which has an integral foldable handle. Another, U.S. Pat. No. 4,974,742 to Farrell et al. discloses foldable handles for microwavable bowls and the like. Another, U.S. Pat. No. 5,373,708 to Dumoulin, Jr., utilizes a pop-up handle. In each of the above cases, the handles accomplish a goal of decreasing space used during storage; however, such handles are limited in the amount of torque and other forces they can withstand. That is, products with foldable handles do not last as long, as regular cookware and cannot be substituted for an average pot found in a kitchen. Further, the handles and cookware of much of the prior art must be held at a particular orientation to avoid undesired folding.

What is needed in the art is a way to obviate the space used by handles, so as to allow cookware and other items with handles to fit into cramped spaces such as refrigerators and any other storage place and/or backpacks and bags without sacrificing strength and utility. The handle, ideally, should be as sturdy and reliable as a non-foldable handle.

SUMMARY OF THE DISCLOSED TECHNOLOGY

The disclosed technology provides a collapsible handle which, in embodiments, collapses or expands by way of force applied along the length of the handle. This allows one to use a vessel with handle in a regular manner, while enjoying the collapsibility as well as strength of a regular handle.

In an embodiment of the disclosed technology, a handle has a series of cascading links, including an attachment link fixedly attached to a vessel (where a vessel is defined as any item capable of at least retaining a liquid or solid, such as a container), a cover link terminating (at the end of) the handle, and at least one central link is movable between the two attachment links at either end. Another central link, while being non-removable from at least two links. That is, that at least one central link, which will be referred to, for the sake of readability, simply as the "central link" (though 1, 3, 6, 12, or any other number of central links may be used), is slidably movable within a first and second interconnected links. The central link has at least three similar polygonal cross-sections of different sizes. "Similar" is defined as either the geometry definition—having the same shape; having corresponding sides proportional and corresponding angles equal; or as being recognizable as a similar shape by the ordinary observer, defined as when some corresponding angles and sides remain proportional and differ from proportional by less than 15%. In this disclosure, "geometric" is used when discussing known geometric definitions, and "generally" or "substantially" is used when within a tolerance level of up to 15% off from the geometric definition.

Referring still to the central link (or any one of the central links), a largest first similar polygonal cross section of . . . ? is larger than a similar polygonal cross section of a first interconnected link connected to the central link. This may be accomplished by protrusions, or flanges extending outwards from the polygon, the polygon being a rectangle, square, or trapezoid in embodiments of the disclosed technology. A smallest second hollow similar polygonal cross-section is smaller than a polygonal cross-section of a second interconnected link. This may be accomplished by indents which are flanges extending inward from the polygon, at an end opposite the protrusions, the indents and protrusions being of the same length and width in embodiments of the disclosed technology. A third hollow similar polygonal cross-section is also present. A hollow area of the central link is enclosed at a first end by (at) the largest of the similar polygonal cross sections, and the hollow area extends through the second and third polygonal cross-sections.

Referring now to other elements of the handle, in embodiments of the disclosed technology knobs extend outward, relative to the hollow area, and from at least two opposing sides of the central link, and are adapted to frictionally engage the first adjacent link. A cover link is connected to a smallest central link, in embodiments, and, in addition, has a closed first end and open second end, the open second end having a similar polygonal cross section to the central link and cross-sectional area greater than that of the attachment link. In a collapsed condition, the cover link covers at least a part of the attachment links, and in a fully cascaded or expanded condition, each smallest cross-sectional polygon of each central link abuts a largest cross-sectional polygon of an adjacent link.

The central link may have parallel side walls connecting between the largest cross-section and said smallest cross-section. Moving from a direction of the largest cross-section to the smallest cross-section of the central link, the side walls may instead be angled towards each other.

In embodiments of the disclosed technology, the cover link covers each other link, when in said collapsed condition.

In still further embodiments, a force parallel to the direction of interconnection of the links is required to collapse or expand any two links and, absent such a force, the state of collapsedness or expansion of each two links with respect to one another remains constant. Still further, the hollow area of a/the central link may have a larger area than that of a/the second interconnected link and a smaller area than that of a/the first interconnected link, such as when trapezoidal links are used.

A series of handle links is also claimed. This series of handle links has a first, second, and third link, each with an elongated first side, two sides generally perpendicular (geometrically or offset an equal amount less than 15% to perpendicular) to the elongated side, and two indents on a side opposite the elongated first side. The two indents point towards each other, and the elongated first side also has two protrusions (outwardly pointing flanges). At least the second link is limited to lateral movement between the first and third links, with limitation of lateral movement caused by the protrusions of the second link abutting the indents of said first link, and further, by the indents of the second link abutting the protrusions of the third link.

The elongated first side of the first link of the series of handle links may be longer than the elongated first side of the second link, which in turn, may be longer than the elongated first side of the third link. In such an embodiment, the generally perpendicular elongated sides are at an acute angle to one another of less than 15 degrees each, compared to geometric perpendicular (in accordance with the definition of "generally perpendicular" provided herein above). In an embodiment different from that described immediately above, the elongated first side of each first, second, and third said link are of equal size, and the generally perpendicular sides are geometrically perpendicular to the elongated side and parallel to each other.

The first link may be fixedly attached to a vessel. Alternatively (when more than a total of three links is used), or in addition (when three links, not including a cover link are used), the third link may be attached to a cover piece having a hollow interior width greater than that of a width of at least a part of the two sides of the first link, and is adapted to cover at least a part of the first link and the second link.

Frictional knobs that extend outwards from each of the two sides of each link may form a unitary structure or be fixedly attached to each link. Further, each indent and each protrusion of each link may be of equal length.

A handle with a series of cascading links is also disclosed having successively smaller trapezoidal links extending from a vessel outwards, with each successively smaller link compressible into a larger link and prevented from detachment thereto by at least one inwardly extending flange of the larger link and at least one outwardly extending flange of the smaller link. A cover may be attached to the smallest link and adapted to cover a largest link of the successively smaller links. The cascading links may be at least six links. In such a case, the distance when fully collapsed (each successively smaller link is fully compressed into each said larger link and, if applicable, the cover covers at least part of the largest link) compared to when fully extended (each inward and outward flange abuts a corresponding flange of an adjacent link) is less than ⅓. That is, the handle can be compressed to less than 33% of its original size, or, depending on the number of links used, even less, such as 30%, 20%, or 10% of its original size.

Each successively smaller trapezoidal link may have an outwardly extending notch adapted to abut an interior of a larger trapezoidal link, the notch may be adapted to abut a proximal side of a larger trapezoidal link, and the notches each prevent collapsing or expansion of the handle, absent applied force normal to the outward extension of each notch.

In accordance with these and other objects, which will become apparent hereinafter, the disclosed technology will now be described with particular reference to the drawings.

A better understanding of the disclosed technology will be obtained from the following detailed description of the preferred embodiments, taken in conjunction with the drawings and the attached claims.

DETAILED DESCRIPTION OF EMBODIMENTS OF THE DISCLOSED TECHNOLOGY

The disclosed technology comprises cookware and other vessels (any item capable of non-permeable retention of liquid), such as pots and pans with rugged and collapsible handles which may decrease in length to be ⅓ or less than their extended size and are usable in both a collapsed or an expanded state. Such handles, in embodiments of the disclosed technology, have covers or ends which, in a collapsed configuration of the handle, entirely cover most or all of the extendable portion of the handle, the covers being usable as handles when collapsed. Individual links of the handle have inward flanges and protrusions adapted to keep the links from disconnecting, and fold into one another in a cascading manner, either becoming successively smaller, or being of equal overall size or width. Exterior notches on each link are used to keep the links from expanding and contracting into one another without lateral force being applied.

Embodiments of the disclosed technology will become clearer in view of the following description of the drawings.

Figure 1:
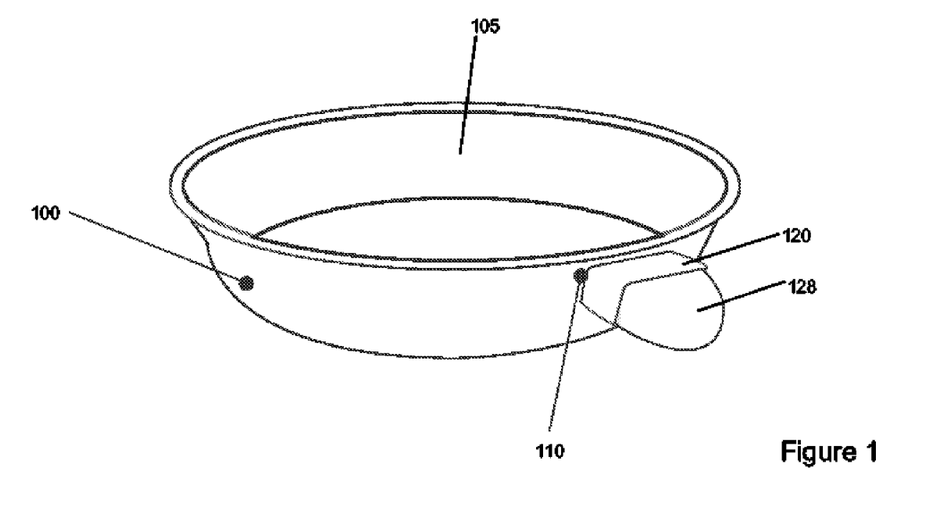
FIG. 1 shows a perspective view of a frying pan with collapsed handle in an embodiment of the disclosed technology.

FIG. 1 shows a perspective view of a frying pan with collapsed handle in an embodiment of the disclosed technology. The frying pan has an exterior 100 and interior 105 with a handle that connects/forms an integral part of the pan at point 110. A lip of the pot 108 (see FIG. 2) separates interior from exterior. A first attachment link 120 is held stationary to, integrated with, or fused with the pan. A cover link 128 is held next to the attachment link 120, forming a continuous handle encompassing the outer surfaces of the attachment link 120 and cover link 128. As such, in this collapsed condition, the handle is functional.

Figure 2:
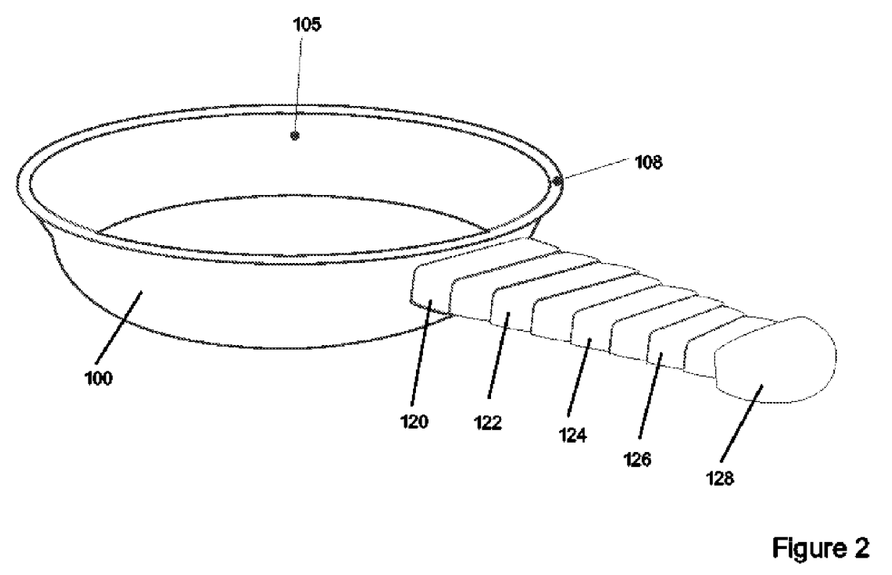
FIG. 2 shows a perspective view of the frying pan of FIG. 1 with an extended handle.

FIG. 2 shows a perspective view of the frying pan of FIG. 1 with an extended handle. As such, successive links 120 through 128 are visible (in this figure, only even-numbered links are labeled for clarity of viewing). In this embodiment, the size of the links, when moving away from the body of the pan, become successively smaller, the links being trapezoid-shaped at the top, sides, and bottom. Further, in this embodiment, 8 total links are used, if counting the attachment link and cover link. A continuous surface is formed between links 120 and 127 (the link between links 126 and 128 and as labeled in FIG. 5), the exception being cover link 128 which, depending on embodiment, is either larger than, or the same size as, the attachment link, e.g., link 120. In this manner, the cover link 128 may cover each other link, or each other link except the attachment link, which it may only abut or partially cover, when the handle is fully collapsed.

Figure 3:
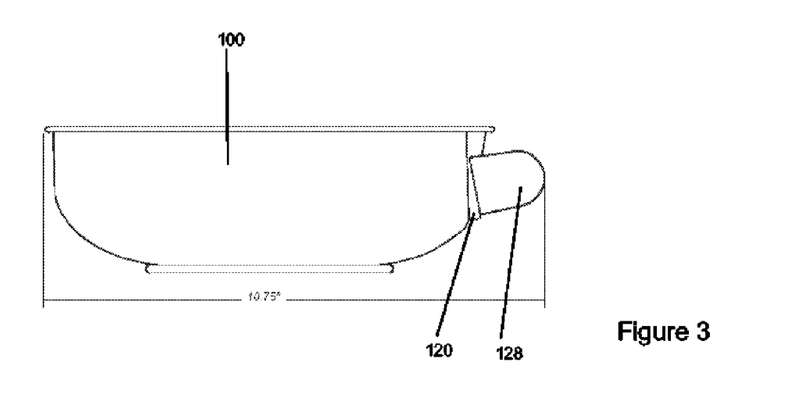
FIG. 3 shows a side elevation view of the frying pan of FIG. 1 with a collapsed handle.

FIG. 3 shows a side elevation view of the frying pan of FIG. 1 with a collapsed handle. As shown in this embodiment, the (top of the) handle forms an acute angle with the side of the pan 100. Multiple handles may be used, such as placing one on either side for carrying a pot, as shown in a later embodiment.

Figure 4:
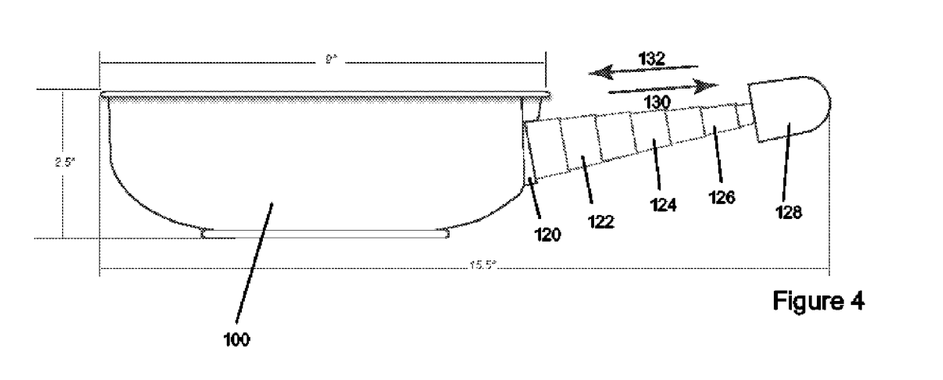
FIG. 4 shows a side elevation view of the frying pan of FIG. 2 with an extended handle.

FIG. 4 shows a side elevation view of the frying pan of FIG. 2 with an extended handle. Arrow 130 points to the direction of expansion and the direction of lateral force required to expand the handle links 120 through 128. Conversely, arrow 132 points to the direction of contraction or collapsing and is the directional force that must be applied on the cover link 128 and, subsequently, on the links 120 through 127 to contract the handle back to the configuration shown in FIG. 3.

Figure 5:
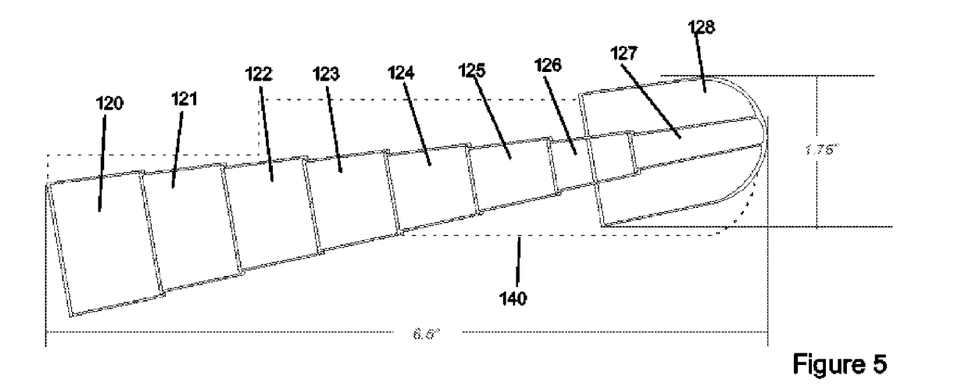
FIG. 5 shows a transparent side view of the extended handle of FIG. 4.

FIG. 5 shows a transparent side view of the extended handle of FIG. 4. Note that each link, in this eight-link handle shown, is labeled. Link 120 attaches to a vessel and is fixedly held in position, relative to the vessel. The cover link is wider than link 120 in this case, allowing it to be covered. Any number of links may be utilized. Note that, as shown in FIG. 5, the cover link 128 completely covers link 127 which is collapsible into link 126, which is collapsible into link 125, and so forth.

Dotted line 140 represents an outline of the extended height and width of the handle, which is comparable to what is required to store the handle in a backpack or cabinet or the like, when stacking pans, pots, or other similarly shaped objects. As to the handle of the pan of FIG. 5, which is shown as an example, it extends 6.5" from the first link 120 to the distal tip of the cover link 128, as shown. The rise of the angled handle is 1.75."

Figure 6:
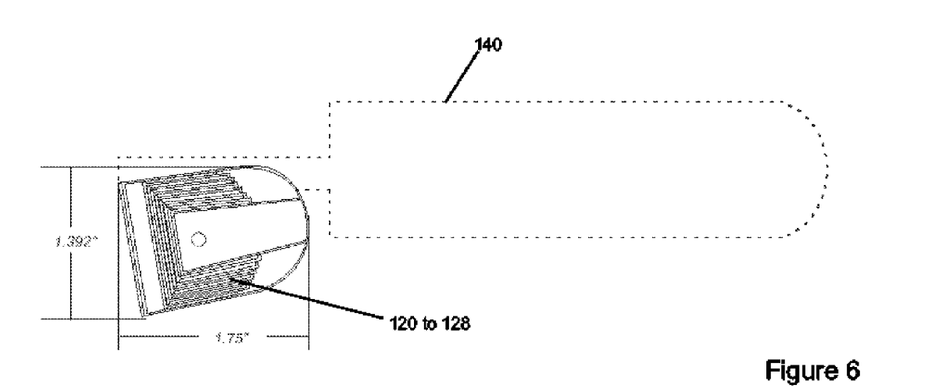
FIG. 6 shows a transparent side view of the collapsed handle of FIG. 3.

FIG. 6 shows a transparent side view of the collapsed handle of FIG. 3. Note that the dotted line 140 remains the same as shown in FIG. 5. A regular non-cascading handle, as known in the prior art, would take up the entire space noted within dotted line 140, at all times (unless broken). Here, however, the handle collapsed into a width of 1.75" and height of 1.392", which is less than the height of the pot itself. Thus, the collapsed or fully cascaded handle adds no extra vertical height, and has a horizontal width which is 26.9% of a full sized handle. In other embodiments, depending on the length of the links (FIGS. 5 and 6 are to scale), material used, number of links, and other factors, one of ordinary skill in the art can adapt the handle to have other compressions of width such as 10%, 20%, 30%, 33% (⅓) or less than each of these percentages, which are within the scope and spirit of the disclosed technology. Further, in the compressed configuration, cover link 128 comprises many other links within a hollow portion thereof, such as links 120 through 127 or 121 through 127. The multiple layers of material inside the cover link 128 (here, about 16 or 18 layers from top to bottom or side to side, relative to the orientation of the pan) make the collapsed handle extremely strong.

Figure 7:
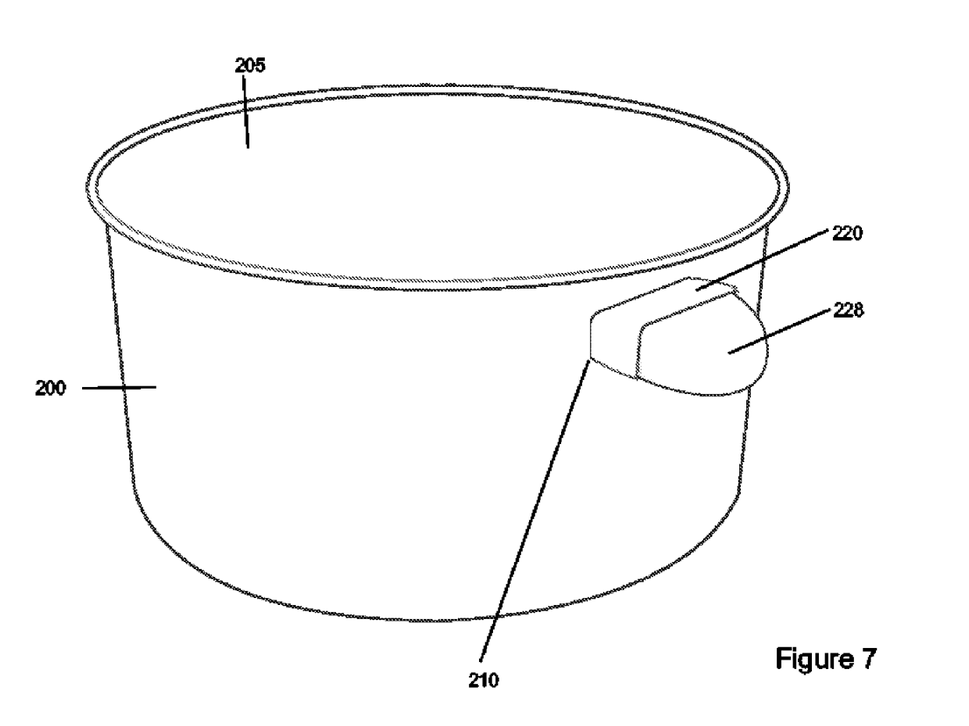
FIG. 7 shows a perspective view of a sauce pan with collapsed handle in an embodiment of the disclosed technology.
Figure 8:
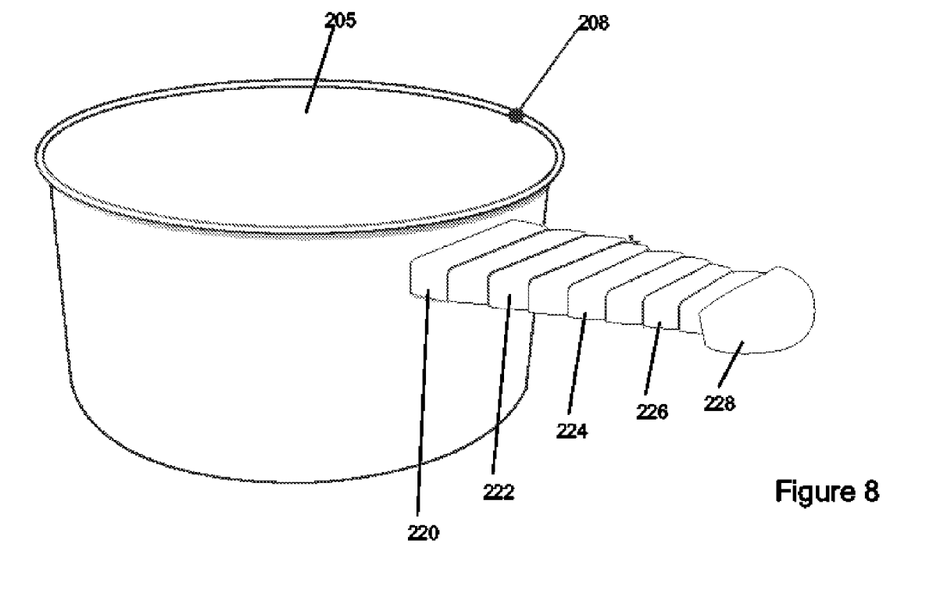
FIG. 8 shows a perspective view of the sauce pan of FIG. 7 with an expanded handle.

FIG. 7 shows a perspective view of a pot with collapsed handle in an embodiment of the disclosed technology. FIG. 8 shows a perspective view of the pot of FIG. 7 with an expanded handle. Elements of FIGS. 1-6 which are analogous to elements of FIGS. 7-13 are incremented by 100. For this pot, the handle (from links 220 to 228) is perpendicular to the side of the exterior of the pot 200 and the links are of increasingly smaller size, with the exception of the cover link 228 which has the same cross-sectional area at its proximal end (side closest to the pot), as does the distal end (side furthest from the pot) of the attachment link 220, such that the attachment link 220 and cover link 228 abut each other when the handle is fully collapsed. Thus, in a collapsed condition, the cover link 228 covers the full outer edge (relative to the pot) of the attachment link 220. In other embodiments, it may cover part or all of the sides as well, and the cover link 228 may even touch the side of the vessel/pot when the handle is fully collapsed.

Figure 9:
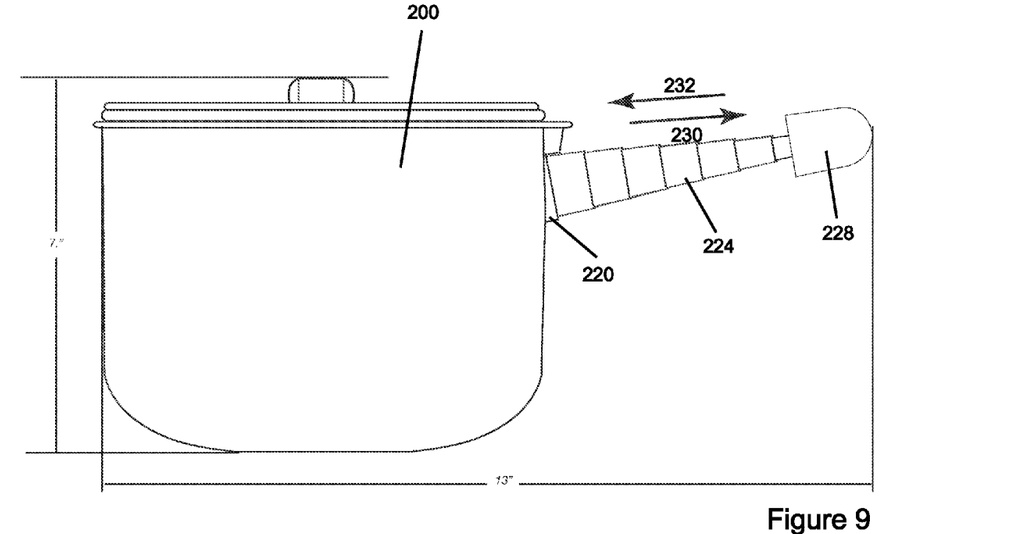
FIG. 9 shows a side elevation view of the sauce pan of FIG. 7 with an expanded handle.
Figure 11:
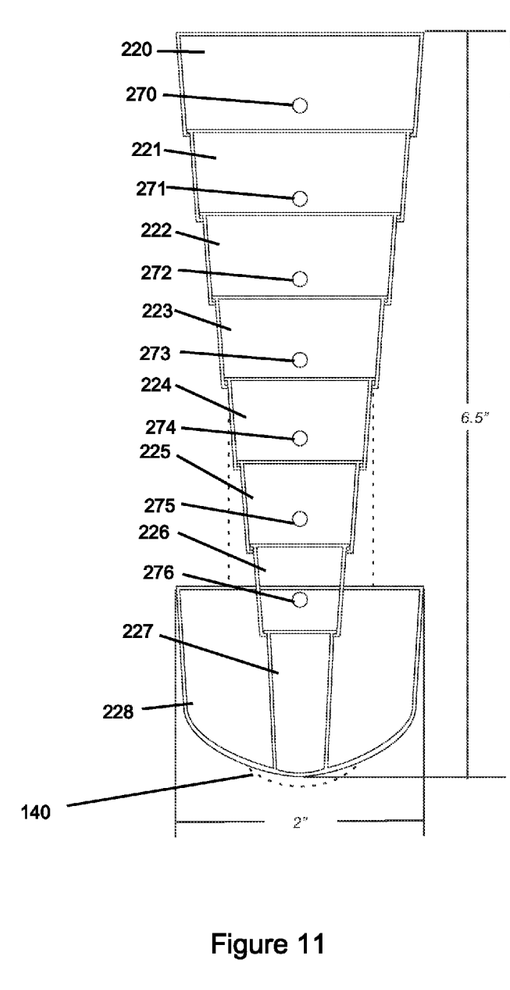
FIG. 11 shows a translucent plan view of an extended sauce pan handle of embodiments of the disclosed technology.
Figure 12:
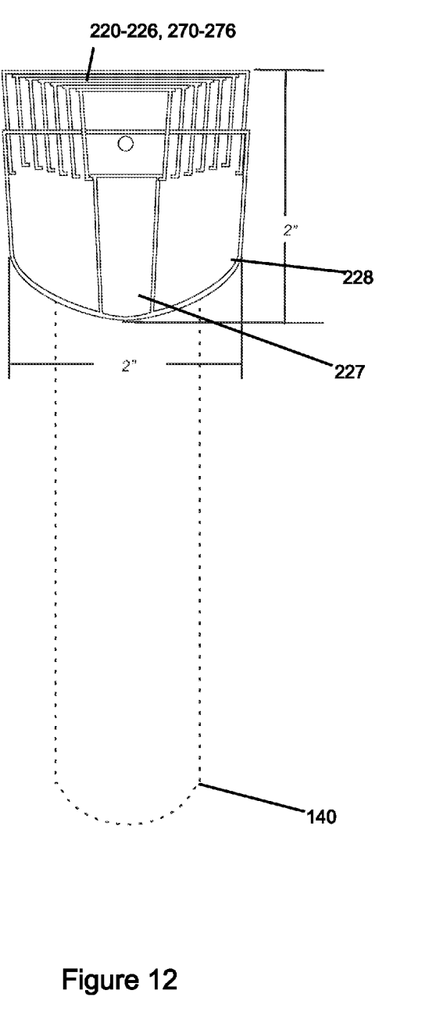
FIG. 12 shows a translucent plan view of a collapsed handle of embodiments of the disclosed technology.

FIG. 9 shows a side elevation view of the pot of FIG. 7 with an expanded handle. This figure, along with FIG. 11-12, is drawn to scale, while elements of the pot have been described with reference to the frying pan (where labels were decreased by 100, comparatively). Here, the entire length of the pot, including handle, is 13", with the height being 7". As one of ordinary skill in the art will appreciate, the pot may be of any dimensions, and the ratios which will be described with reference to FIG. 11-12 apply to any similar pot (based on the geometric definition of 'similar').

Figure 10:
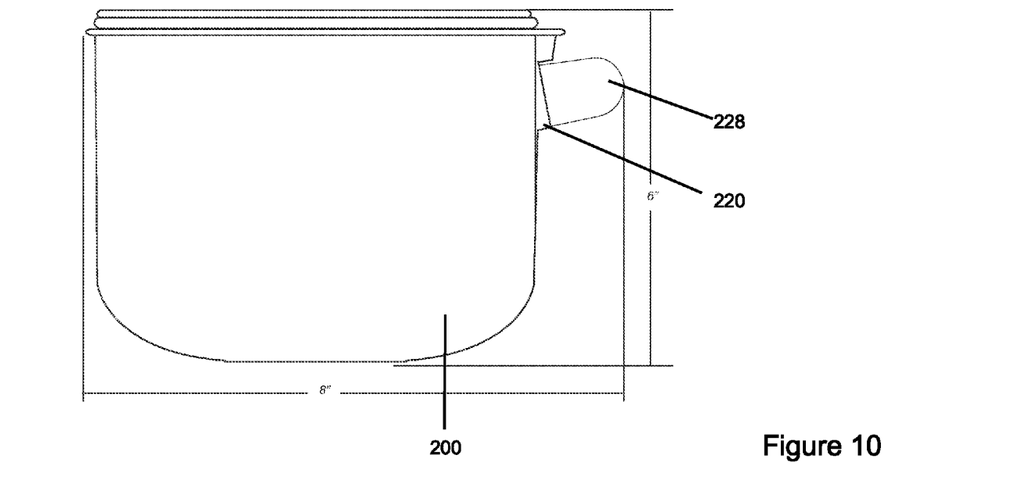
FIG. 10 shows a side elevation view of the sauce pan of FIG. 7 with a collapsed handle.

FIG. 10 shows a side elevation view of the pot of FIG. 7 with a collapsed handle. The handle 220 through 228 (with attachment link 220 and cover link 228 shown in this exterior view) is collapsed and cascaded together, such that the overall height of the pot is decreased and the entire width of the pot, including handle, is now 8". When used with a collapsible or removable handle on the lid (subject of a separate patent application filed contemporaneously with this disclosure), the height may be further decreased. Focusing on the width, the overall width when collapsed is 61.5% of the extended width. In other embodiments, by varying the length of the links, number of links, and so forth, the overall width is reduced to less than 50%, as is part of this technology, and is able to be carried out by one having ordinary skill in the art based on this disclosure. Further, the decrease from 13" to 8" (or any similar amount) is a decrease in the Fibonacci sequence, which, based on the mathematical decrease, is thought by some to have aesthetically pleasing qualities which are also part of the disclosed technology.

FIG. 11 shows a translucent plan view of an extended pot handle of embodiments of the disclosed technology. The cascading links 220 through 228 each have at least one notch which is incremented by 50 over the link to which it belongs. The notches, 271, 272, 273, 274, 275, 276 are "pimples" which extend outwards from the surface of the respective link. Though only one side of the handle is shown in this figure, it should be appreciated that notches, in embodiments of the disclosed technology, are on two sides (such as two opposing sides), three sides, or four sides. As the links are of any polygonal shape, such as trapezoidal (shown in FIG. 11)

or rectangular (shown in FIG. 14), or may even be irregular polygons of 4, 5, 6, 7, 8, 9, or 10 sides, additional notches may be desired. The notches may have corresponding recesses in an adjacent link. The notches are adapted to frictionally engage an adjacent link when one link is collapsed into another. That is, by way of a snug fit between any two links when cascaded, the notch extends between the polygonal sections thereof (between the walls of two interlinked links) to frictionally engage the links and prevent lateral movement with exertion of force in the lateral direction, such as forces 230 and 232 shown in prior figures. Likewise, when the links are extended, in embodiments of the disclosed technology, the notches 270 through 276 (or other notches utilized) abut an end of a side of a link, preventing its collapsing. As shown in FIG. 11, notches 270 through 276 abut and are recessed into an adjacent link, preventing lateral movement of the links without applying lateral force sufficient to overcome the frictional engagement.

FIG. 12 shows a translucent plan view of a collapsed handle of embodiments of the disclosed technology. Note that the length is decreased similarly to that described with reference to FIG. 6. Note also that the central links (those between the attachment link and cover link, e.g. links 221 to 226) are each positioned fully between the side walls of the attachment link. The definition of "central link" is a movable link with inward extending flanges adapted to abut a flange more distal from the vessel than itself. Link 227 shown in the Figure is considered to be part of the cover, as it moves with the cover, and is not a central link.

Still referring to FIG. 12, note the indents (inward pointing flanges connected to each side wall of each link 220 to 226) and protrusions on an opposite side of each indent, which protrude from a wall of each of the links, at a proximal side, with respect to the vessel. The inward flanges and protruding flanges may also be seen in FIGS. 5 and 11, and are described with greater detail below. Of the central links, each protrusion is adapted to abut an indent of an adjacent link, when extended, and each proximal elongated side is adapted to abut each other one, successively, when compressed fully.

Figures 13A, 13B:
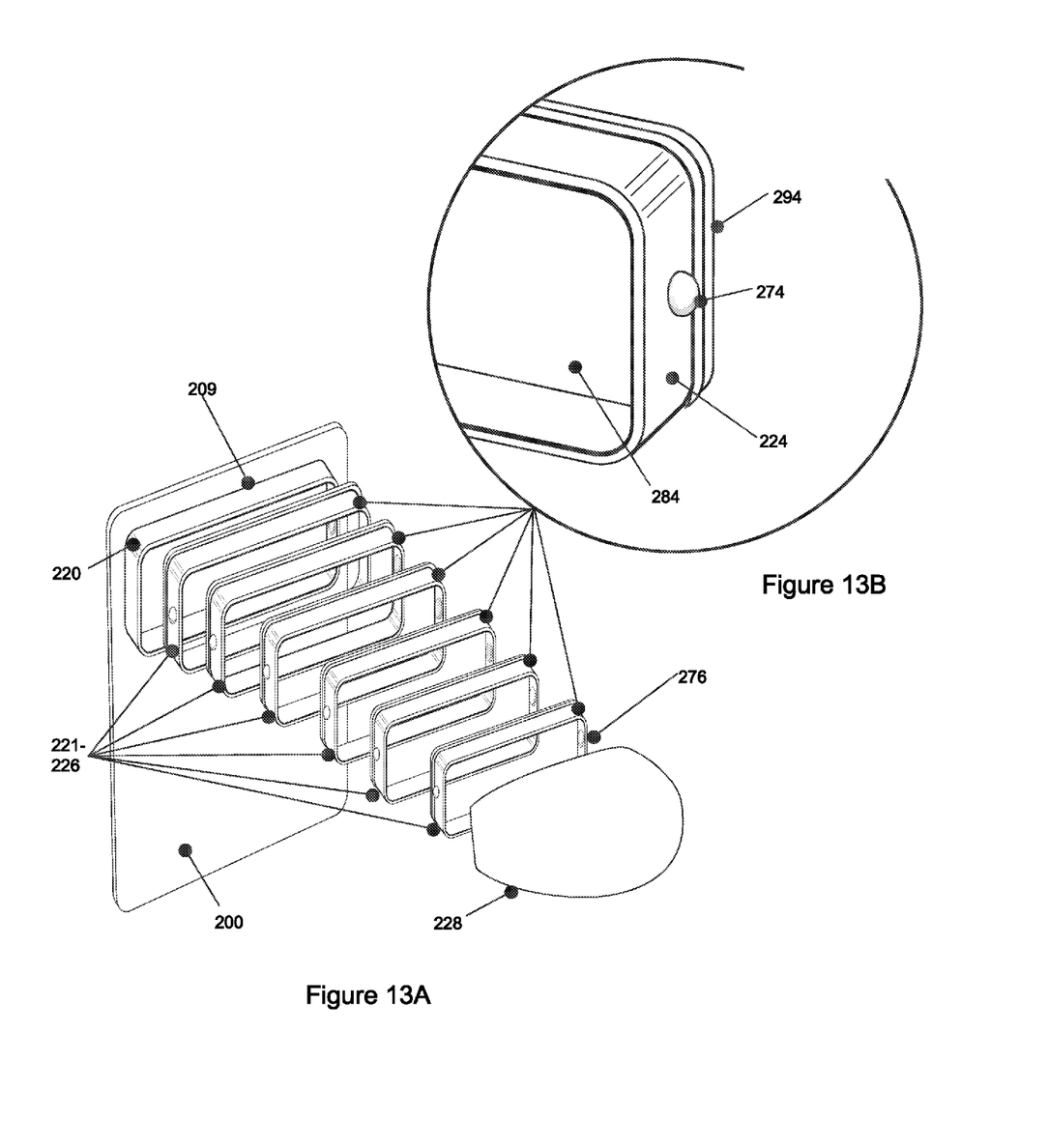
FIG. 13A shows a perspective, exploded view of links of an extension handle of embodiments of the disclosed technology.
FIG. 13B is an inset of FIG. 13A showing an individual cascading link of an extension handle.

FIG. 13A shows a perspective, exploded view of links of an extension handle of embodiments of the disclosed technology. FIG. 13B is an inset of FIG. 13A showing an individual cascading link of an extension handle. Referring to the inset, the protrusion described with reference to FIG. 12 is labeled as protrusion 294. The notch/pimple is labeled as pimple 275. The 224 label actually points to a side wall of link 224, the other side wall being on the opposite side and having another pimple, as seen in FIG. 13A. A front wall 284, the wall comprising the protrusion 294, extends across the piece (shown only in FIG. 13B; FIG. 13A shows a portal in place of the wall). This front wall 284 is abutted to a respective front wall of each of two adjacent links, such as of links 223 and 225 (the links next to link 224). It should be understood that FIG. 13B represents any of the links from 221 to 226, and the ones whose digit ends in the same digit as the link. Thus, front wall 280 of the attachment link/piece 220 abuts front wall 281 of link 221, which in turn also abuts front wall 282 of link 222, and so forth, when the handle is fully collapsed, in an embodiment of the disclosed technology. At the rear side of each link, there is an inward flange which catches the respective protrusion of the adjacent link, when fully extended. This is more clearly shown in FIG. 11, and further figures below.

Figures 15A, 15B:
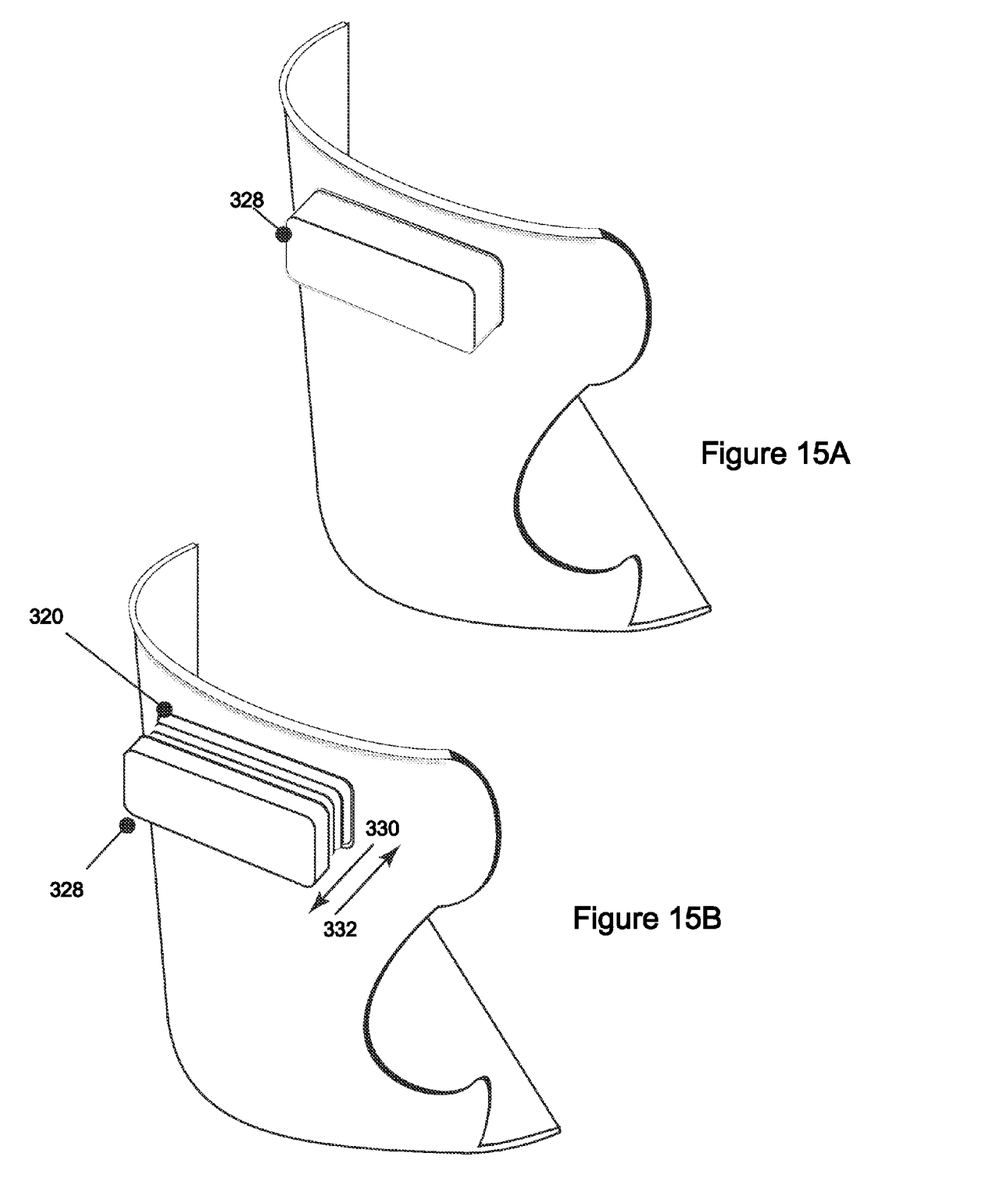
FIG. 15A shows a side perspective view of a collapsed pot handle of an embodiment of the disclosed technology.
FIG. 15B shows a side perspective view of the pot handle of FIG. 15A in an expanded condition.

FIG. 15A shows a side perspective view of a collapsed pot handle of an embodiment of the disclosed technology. FIG. 15B shows a side perspective view of the pot handle of FIG. 15A in an expanded condition. Note that cover 328 covers the rest of the links in the closed position, including attachment link 320 which is fixedly attached to the pot. The rest of the links are movable and linked (directly or indirectly) to the attachment link 320 and are expanded or contracted by providing force in a direction normal to the pot wall, 330 and 332, respectively.

Figure 14:
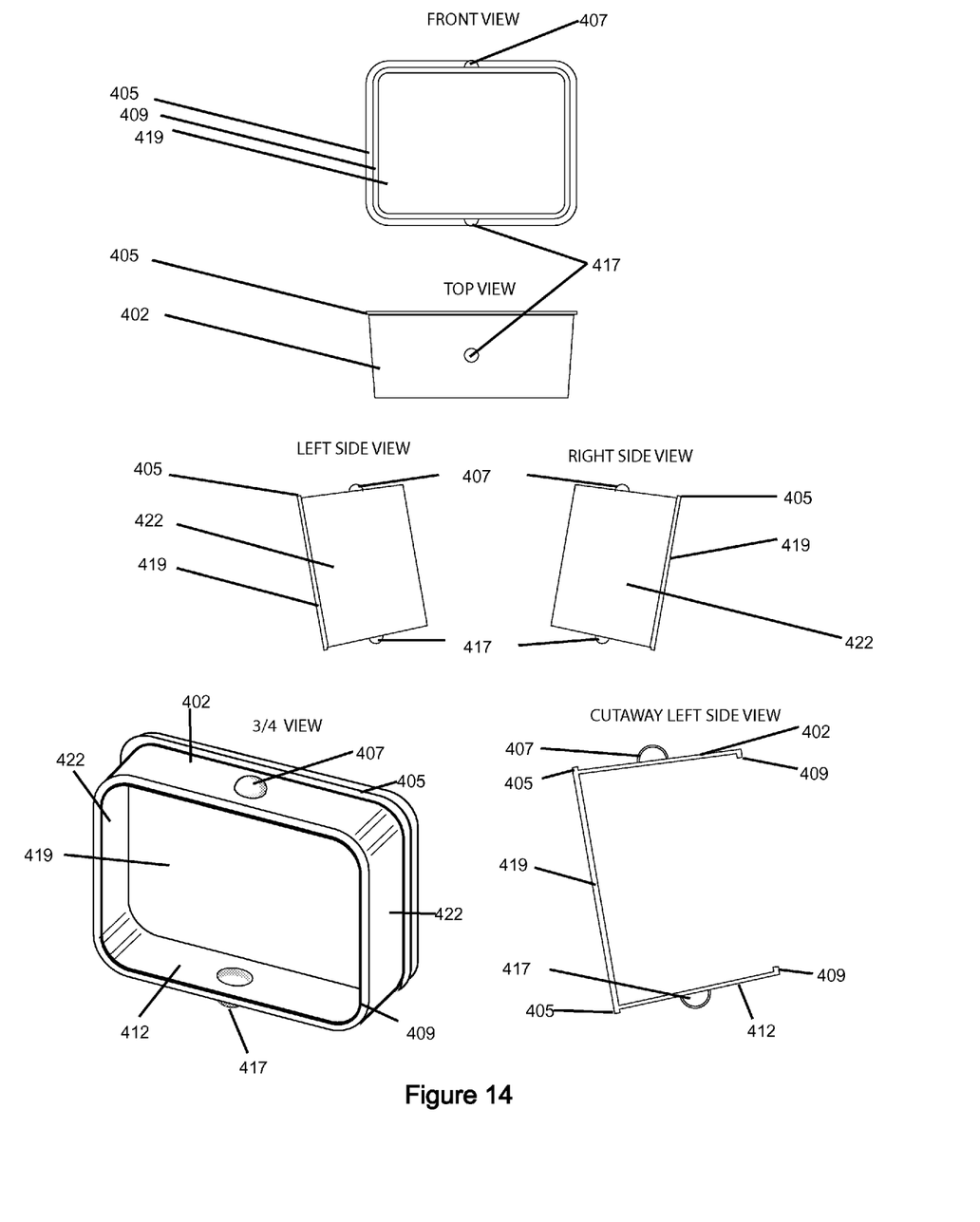
FIG. 14 shows a top view, side views, ¾ view, and cutaway view of a trapezoidal link which is used to carry out embodiments of the disclosed technology
Figure 16:
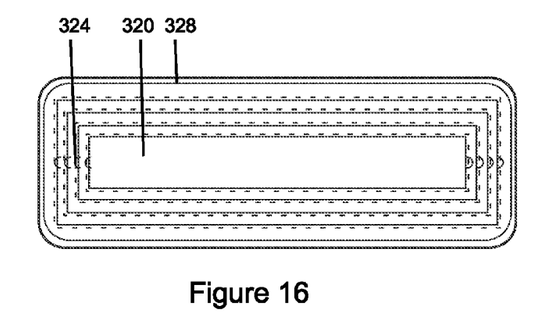
FIG. 16 shows a view of links of the pot handle of FIG. 15A through a back side thereof.
Figure 17:
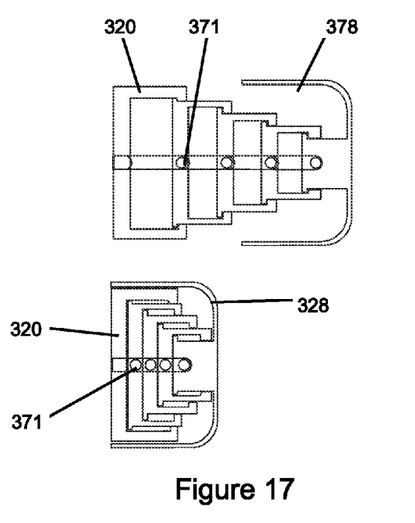
FIG. 17 shows a side cutaway view of the links of the pot handle of FIG. 15A.
Figure 18:
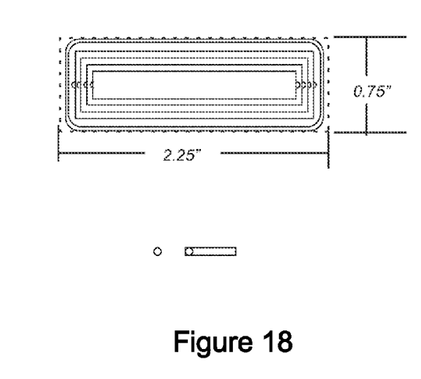
FIG. 18 is a version of FIG. 16 with size indicators of the pot handle of an embodiment of the disclosed technology.

FIG. 15 shows a view of links of the pot handle of FIG. 14 through a back side thereof. FIG. 16 shows a side cutaway view of the links of the pot handle of FIG. 14. FIG. 17 is a version of FIG. 15 with size indicators of the pot handle of an embodiment of the disclosed technology. FIG. 18 is a version of FIG. 16 with size indicators of the pot handle of an embodiment of the disclosed technology. A notch, such as notch 371, is on the side of each link, with link 320 being smaller than link 324, which is smaller than link 328. That is, each successive link is smaller than the preceding link, with the cover piece, e.g., cover 378, being wider than the attachment piece.

Figure 19:
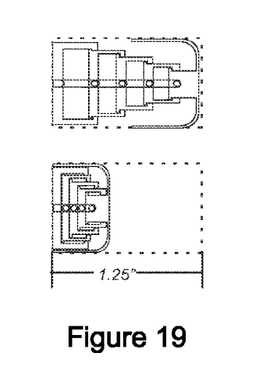
FIG. 19 is a version of FIG. 17 with size indicators of the pot handle of an embodiment of the disclosed technology.
Figure 20A:
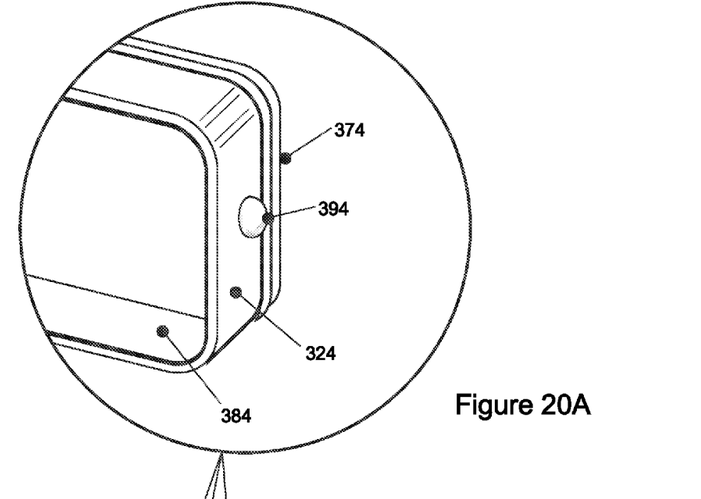
FIG. 20A shows a exploded perspective view of a pot handle of an embodiment of the disclosed technology.
Figure 20B:
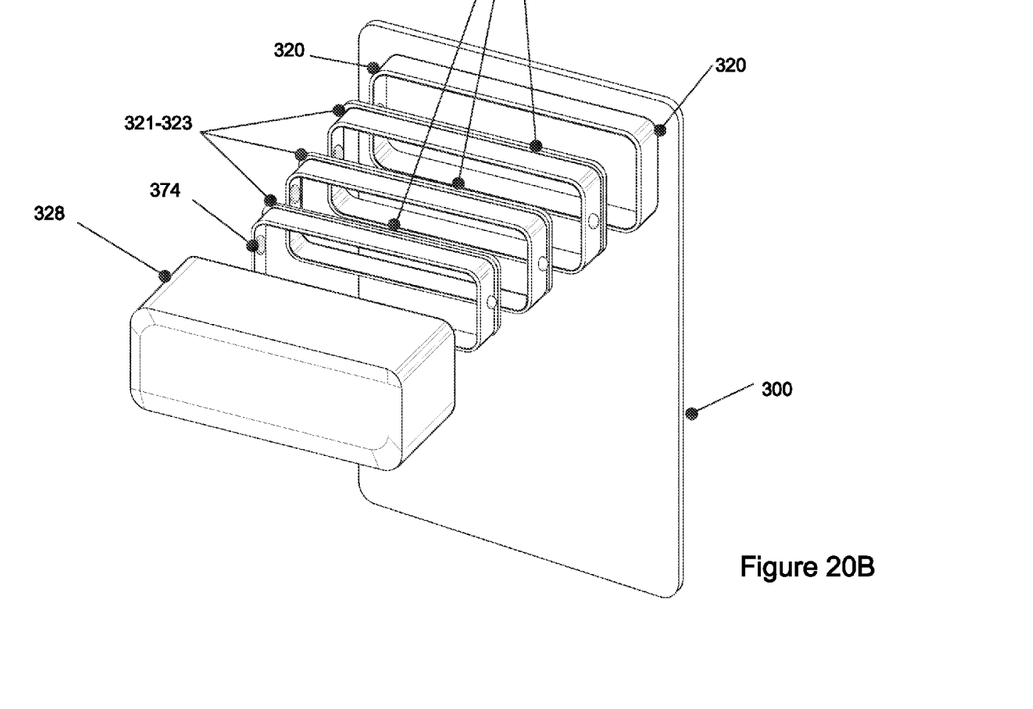
FIG. 20B shows an inset of a single link of the pot handle of FIG. 20A.

FIG. 19A shows a blown-apart perspective view of a pot handle of an embodiment of the disclosed technology. FIG. 19B shows an inset of a single link of the pot handle of FIG. 19A. In this embodiment, the handle is rectangular-shaped, and the side walls are parallel to each other. Cover piece 328 is linked to link 323, which has the smallest cross-sectional area, which is in turn linked to link 322, which is in turn linked to link 321, which is linked to the attachment link 320, which, respectively, become larger in cross-sectional area. That is, the rectangular cross-sections thereof become larger when moving toward the pot 300, the cover 328 having a cross-section area larger than the attachment piece 320. Side notches, such as notch 394 on side walls, such as side wall 324 of link 374, keep the links from moving with respect to one another when movement is not desired.

FIG. 14 shows a top view, side views, ¾ view, and cutaway view of a trapezoidal link which is used to carry out embodiments of the disclosed technology. When using trapezoidal links, in succession, the links provide a smooth-surfaced handle and may be comfortably grasped along the entire length thereof. Two different-sized rectangular cross-sections are formed at each front and back side of each link. For the link shown in FIG. 14, as seen best in the front view and ¾ view, a top wall 419 solidly extends between side walls 402, 412, and 422. One side wall 402 comprises a notch 407 breaking from the plane of the wall, outwards from plane or outwards from the center of the link. Likewise, notch 417 extends outwards from side wall 412. However, the top wall 419 is larger than the sidewalls in breadth. That is, a cross-section of the link along the top wall 419 has a protrusion 405 which forms a larger rectangle. This is best seen in the front view where rectangle 405, the protrusion of the top wall 419, produces a larger rectangular size (and cross-section) than that of the rest of the link, and further, the intended wall 409 (see front view and ¾ view) produces a smaller rectangular cross section. All of these cross-rectangular polygons (for purposes of this disclosure, a rounded polygon, such as the rounded polygon shown in FIG. 14, is considered to be a proper, mathematically-defined polygon) are similar to one another according to the geometric definition. In other embodiments, the polygons are substantially similar.

As further seen in the top view, left side view, and right side view, a trapezoidal shape is shown as the side walls 422 move inwards with respect to each other, when moving in the direction from the full side 419 with protrusions 405 towards the back of the link having the indent 409. In embodiments of the disclosed technology, each central link in a series of links forming a handle has similar polygonal or similar-shaped protrusions 405 and indents 409, whereby each protrusion 405 has a cross-sectional area greater than that of the indent of an adjacent link, and vice versa. That is, in addition, the indent 409 has a smaller cross-sectional area than that of a protrusion 405 of an adjacent link. In this manner, the links are held together. When compressed, the top wall 419, with protrusion 405, moves towards a top wall 419 of an adjacent, larger link (having a larger area defined between the walls and/or larger front wall 419). When uncompressed, the opposite occurs; a top wall 419 with protrusions 405 moves towards an indent 409 of an adjacent link. In this manner, one link may move laterally with respect to another, but is prevented from moving too far in either direction by a front wall 419 and indent 409. The notches 407/417 prevent movement without the application of force parallel to the direction of linkage. In this manner, 2, 3, 4, or any greater number of links may be held together and expanded or collapsed, in succession.

Referring now to the cutaway left side view of FIG. 14, it should be appreciated that a cross-sectional view of the larger front wall, smaller back wall, and side walls are shown. The distances from one end of a protrusion 405 to the other is greater than that of the distance from one end of an indent 409 to the other. The distance between protrusions 405 (really, one protrusion, but in this two dimensional cutaway of a three dimensional object, appearing on two separate ends) is larger than the distance between indents 409 of the next largest/adjacent link. The indents 409 shown are smaller in distance than that of the next smallest adjacent link of the protrusions 405. As each piece is smaller than an adjacent piece, it follows that the hollow area defined between the walls 402, 419, 412, and imaginary wall between the protrusions 409 (shown in the cutaway view) also becomes narrower.

Figure 21:
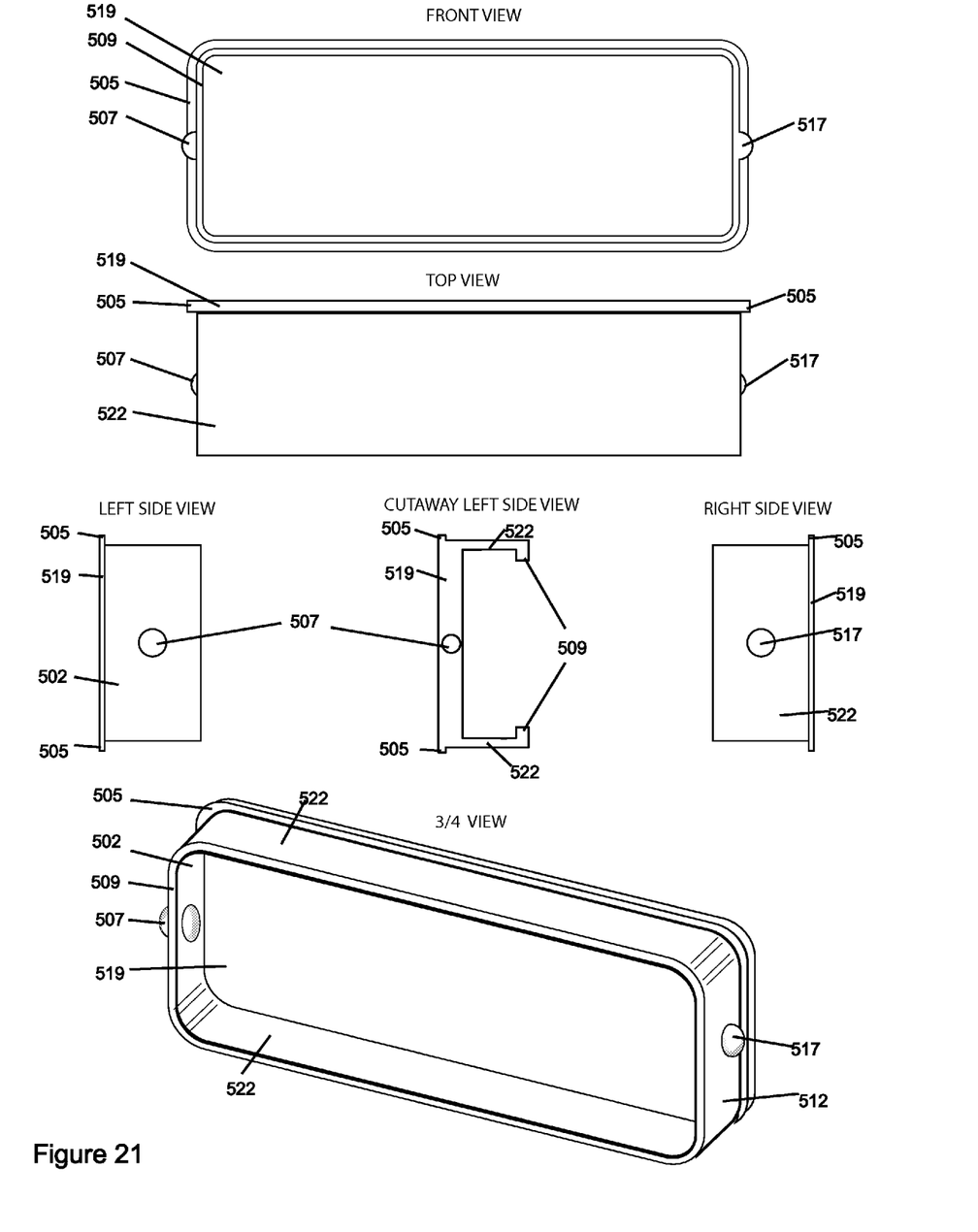
FIG. 21 shows a top view, side views, ¾ view, and cutaway view of a rectangular link, which is used to carry out embodiments of the disclosed technology.

FIG. 21 shows a top view, side views, ¾ view, and cutaway view of a rectangular link, which is used to carry out embodiments of the disclosed technology. Elements of FIG. 14 have been incremented by 100, where analogous. Here, the side walls 502 and 512 are in parallel. All other features of FIG. 21 remain as described with reference to FIG. 14.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A handle comprised of a series of cascading links, including an attachment link fixedly attached to a vessel, a cover link terminating said handle, and at least one movable central link between said attachment link and said cover link, wherein:

said at least one central link is movable by sliding within a first and a second interconnected link and comprises at least three similar polygonal cross sections of different sizes, wherein:
  a. a largest first said similar polygonal cross-section of said at least three cross sections is larger than a similar polygonal cross- section of a first interconnected link, and
  b. a smallest second hollow said similar polygonal cross-section is smaller than a polygonal cross-section of a second interconnected link;
  c. a third said hollow said similar polygonal cross-section; and
a hollow area of said at least one central link is enclosed at a first end by said largest of said similar polygonal cross-sections and extending through said second and said third polygonal cross-sections;
knobs extend outwards, relative to said hollow area, from at least two opposing sides of said at least one central link and frictionally engage said first adjacent link;
said cover link is connected to a smallest said central link and further comprises a closed first end and open second end, said open second end having a similar polygonal cross-section to said at least one central link and cross-sectional area greater than that of said attachment link; and
in a collapsed condition, said cover link covers at least a part of said attachment link and in a fully cascaded or expanded condition, each smallest cross-sectional polygon of each said central link abuts a largest cross-sectional polygon of an adjacent link.

2. The handle of claim 1, wherein said at least one central link comprises parallel side walls connecting between said largest cross-section and said smallest cross-section.

3. The handle of claim 1, wherein, moving from a direction of said largest cross-section to said smallest cross-section of said at least one central link, side walls of said central link are angled towards each other.

4. The handle of claim 1, wherein said cover link covers each other link when in said collapsed condition.

5. The handle of claim 1, wherein a force parallel to the direction of interconnection of said links is required to collapse or expand any two links and, absent such a force, said state of collapsedness or expansion of each two links with respect to one another remains constant.

6. The handle claim 1, wherein said hollow area of said at least one interconnected link comprises a larger area than that of said second interconnected link and a smaller area than that of said first interconnected link.

* * * * *